United States Patent [19]

Wilson

[11] Patent Number: 4,732,966
[45] Date of Patent: Mar. 22, 1988

[54] POLYAMIDE RESIN CONTAINING FREE AMINO GROUPS PRODUCED FROM POLYMERIC FATTY ACID

[75] Inventor: Alec F. Wilson, Eltham, Great Britain

[73] Assignee: Coates Brothers PLC, Orpington, England

[21] Appl. No.: 828,765

[22] Filed: Feb. 11, 1986

[30] Foreign Application Priority Data

Feb. 12, 1985 [GB] United Kingdom ............... 8503515

[51] Int. Cl.$^4$ .......................................... C08G 69/34
[52] U.S. Cl. .............. 528/339.3; 525/420.5; 525/423; 525/526; 528/183; 528/186; 528/189; 528/208; 528/342
[58] Field of Search ............ 528/339.3, 342, 183, 528/186, 189, 208

[56] References Cited

U.S. PATENT DOCUMENTS 2,886,543  5/1959  Peerman et al. ............... 528/339.3
3,037,871  6/1962  Floyd et al. .................... 528/339.3

Primary Examiner—Harold D. Anderson
Attorney, Agent, or Firm—Louis E. Marn

[57] ABSTRACT

Polyamides containing free amino groups and suitable for use as curing agents for polyepoxy compounds are derived from (a) a polybasic acid component comprising polymeric fatty acid together with from 10 to 90 mole %, based on the total acid component, of one or more aromatic dicarboxylic acids containing two carboxylic acid groups and one benzene ring, each carboxylic acid group being directly linked to a benzene ring, and (b) a polyamine component containing at least 50 mole % of one or more aliphatic polyamines containing at least three amino groups per molecule.

Cured resinous composition may be prepared by reacting the polyamides with polyepoxy compounds and curable composition contain the polyamides together with polyepoxy compounds.

4 Claims, No Drawings

POLYAMIDE RESIN CONTAINING FREE AMINO GROUPS PRODUCED FROM POLYMERIC FATTY ACID

This invention is concerned with improvements in and relating to polyamide resins. More particularly, the invention is concerned with polyamide resins containing free (non-amidifed) amino groups and which are suitable for use as curing agents for polyepoxy compounds (so-called "epoxy resins").

The use of polyamide resins containing free amino groups as curing agents for polyepoxy compounds is well established. Thus such polyamides derived from the polycondensation of polymeric fatty acids and aliphatic polyamines are discosed in U.S. Pat. No. 2,430,940 and compositions comprising polyepoxy compounds together with such polyamides are disclosed in U.S. Pat. No. 2,705,223 and British Patent Specification No. 726570. Polyamide curing agents derived from polymeric fatty acids and aliphatic polyamines are commercially available under the trade name "Versamid", being manufactured in the United Kingdom by Cray Valley Products Limited and in the United States of America by Henkel Corporation of America (formerly General Mills).

Polyamide curing agents react with polyepoxy compounds to form cured systems by reaction of free amino groups of the polyamide with epoxy groups of the polyepoxy compound, leading to gradual cross-linking and insolubilisation of the system. At ambient temperature, reaction takes place over a period of time depending on the nature of the polyamide curing agent and the polyepoxide compound and the ratio of polyamide to polyepoxy compound. The application of heat accelerates the reaction.

Polyepoxide compound/polyamide curing agent systems are widely used in the surface coatings art. The outstanding toughness, chemical resistance and corrosion resistance of coatings based on such systems coupled with their excellent adhesion to a variety of substrates make them ideal for heavy duty maintenance coatings.

However, when used in combination with some types of epoxy resins, preferably available polyamides are less than satisfactory. Thus, drying times may be extremely long and surface defects such as residual tackiness, blooming, cissing or rivelling may be apparent, especially under adverse conditions such as low temperature and/or high humidity. In order to overcome such problems it has been proposed to pre-age the polyamide/epoxy resin mix before use or to use a polyamide/epoxy resin adduct in place of the polyamide curing agent; as disclosed, for example, in British Pat. No. 988 484.

It has now been found, in accordance with the present invention, that certain polyamides derived from certain aromatic polybasic carboxylic acids and polymeric fatty acids are useful curing agents for polyepoxy compounds and possess, inter alia, the advantages that they can give systems which have shorter drying times than the polyamide curing agents discussed above, and give products free from surface defects as discussed above.

According to the invention, therefore, there is provided a polyamide containing free amino groups and suitable for use as a curing agent for polyepoxy compounds which polyamide is derived from (a) a polybasic acid component containing a polymeric fatty acid together with from 10 to 90 mole %, preferably from 20 to 80 mole %, based on the total of the polybasic acid component, of one or more aromatic dicarboxylic acids; and (b) a polyamine component containing at least 50 mole % of one or more aliphatic polyamines containing at least three amino groups per molecule.

Polymeric fatty acids for use in accordance with the invention are well-known and are obtained by the polymerization of unsaturated long chain fatty acids as described, for example, in "The Chemistry of Organic Film Formers", D. H. Solomon, Krieger 1977, at pages 69 and 70. The polymerization products consist largely of dimers (and hence are often referred to as "dimer acids") together with smaller amounts or trimers and higher oligomers. Polymeric fatty acids (dimer acids) are commercially available, for example under the trade names "Craymer" (Cray Valley Products Ltd.) and "Empol/Pripol" (Unichema).

Aromatic dicarboxylic acids for use in accordance with the invention are those containing two carboxylic acid groups and at least one benzene ring, each carboxylic acid group being directly linked to a benzene ring. Where the acid contains two benzene rings these may be directly linked to each other or via the intermediary of a short length linking group such as an oxygen atom or methylene group. Particular examples of aromatic dicarboxylic acids which may be used include iso-phthalic acid, terephthalic acid, diphenic acid (diphenyl 2,2'-dicarboxylic acid), and diphenyl ether-4,4'-dicarboxylic acid.

In addition to the polymeric fatty acid and aromatic dicarboxylic acids, the acid component may contain minor amounts of monocarboxylic acids to control the molecular weight of the polyamide. Examples of such mono-functional acids are monocarboxylic aliphatic acids such as acetic acid, propionic acid, isobutyric acid and long chain fatty acids; and aromatic monocarboxylic acids such as benzoic acid and butyl benzoic acid.

The acid component may also contain aliphatic dicarboxylic acids such as adipic acid, pimelic acid, azelaic acid, sebacid acid, dodecane dioic acid and West Vacco di-acid (a $C_{21}$ dicarboxylic acid prepared by the addition of ascrylic acid to conjugated linoleic acid). In addition, the acid component may contain, minor amounts of anhydrides such as maleinised fatty acids, phthalic anhydride, trimellitic anhydride, pyromellitic di-anhydride and do-decenyl succinic anhydride.

In any event, however, the acid component should contain at least 10 mole % of polymeric fatty acid, preferably at least 30 mole % thereof.

Preferred aliphatic polyamines for use in the invention are those of the formula:

$H_2NR(RNH)_nNH_2$, in which R is an alkylene radical, especially a methylene radical, and n is an integer of from 1 to 6. Examples of such amines include diethylene triamine, triethylene tetramine, tetraethylene pentamine, pentaethylene-hexamine, di-1,3-propane triamine, tri-1,3-propane tetramine, di-1,2-propane triamine and the like. The polyamine component may consist only such of such polyamines or may comprise other polyamines, for example alpha-omega aliphatic diamines (such as ethylene diamine, propylene diamine, tetramethylene diamine and hexamethylene diamine); and cycloaliphatic diamines such as 1,4-diamino-methyl-cyclohexne and isophorone diamine.

The amine compound may also contain, in order to control molecular weight, minor amounts of monoamines such as fatty amines, propylamine and butylamine.

The polyamides of the invention are produced by polycondensation of an appropriate polybasic acid component with an appropriate polyamine component. The polycondensation is carried out under conditions conventional for the production of polyamides, for example at temperatures of from 200° to 280° C., preferably from 230° to 250° C., and under conditions such that water evolved during the course of the polycondensation may be removed from the reaction mixture. (In this connection it may be noted that in some cases the polybasic acid component may comprise, at least in part, lower alkyl esters of the acids from which the polyamine is derived. In this case polycondensation should, of course, be carried out under conditions such that the lower alcohol formed during the course of the condensation is removed from the reaction medium. As will be appreciated, in principle a polyamide derived from an ester of an polycarboxylic acid is the same as one derived from the acid per se.

The polycondensation reaction may be carried out by charging all the ingredients to a suitable reactor or may be carried out by adding the reactants in stages to the reactor.

The polycondensation will generally be carried out using an excess of amino groups over carboxylic acid groups and the resulting polyamide, the polyamide of the invention, suitably has an amine value of from 100–400 mgKOH/g, preferably from 150–350 mgKOH/g. Preferably the acid value of the polyamide is from 0–20 mgKOH/g.

The polyamides of the invention range from balsam-like materials to hard resinous materials having melting points in the range of 60°–150° C. depending on the amount of aromatic acid employed and the nature and amount of amine employed. In general, the lower melting point products are soluble in solvents such as xylol whilst the higher melting point products display solubility in aliphatic alcohols, such as ethanol, propanol or butanol, or mixtures thereof with xylol. Dissolution of the polyamide in the solvent may be accomplished by either cold churning or by refluxing the resin/solvent mixture.

As noted above, the polyamides of the invention are suitable for use as curing agents for polyepoxy compounds.

Thus, a further embodiment of the invention provides a process for the production of a cured resinous product which comprises reacting a polyamide in accordance with the invention with a polyepoxy compound. Further, the invention provides curable compositions comprising polyamide of the invention together with a polyepoxide compound. In this latter connection it will, of course, be understood that such compositions will tend to react and will hence be marketed in the form of two-part packs, one part containing the curing agent (polyamide resin) and the other containing the polyepoxide compound.

The polyamides of the invention may be used to cure a wide variety of polyepoxy compounds. Thus, for a general review of polyepoxy compounds reference may be made to "Handbook of Epoxy Resins", Lee and Neville, McGraw-Hill, 1967, Chapters 1-3 and "Encyclopedia of Polymer Science and Technology", Mark and Gaylord, Interscience Publishers, 1967, pages 209–270—"Epoxy Resins".

Thus by way of example the polyamide curing agents of the invention may be used in the curing of polyepoxy compounds derived from bisphenols, especially bisphenol-A, such as those sold under the trade names Epikote 828 and 1001 (Shell) and D.E.R. 334 (Dow). Similarly the polyamides may be used to cure hydrogenated polyepoxy compounds derived from bisphenols such as that sold under the trade name "DRH 152" (Shell). Other polyepoxy compounds which may be cured include flexible polyepoxy compounds (such as that sold under the trade name Epikote 872); Hydantoin based polyepoxy compounds (such as that sold under the trade name MS6064 by Ciba-Geigy); Epoxy acrylics (such as those sold under the trade name Epirez 5027 and 50727 by Celanese); polyepoxides derived from polyols [e.g. glycerol triglycidyl ether as sold under the trade name G-1701 (Grilonit) and Sorbitol polyglycidyl ether sold under the trade name EX 612 (Nagase)]; and epoxy novolaks (such as that sold under the trade name DEN 431 by Dow).

In order that the invention may be well understood the following examples are given by way of illustration only.

EXAMPLE 1

Comparative Example

Tall oil fatty acids (168 g) and dimerised fatty acids (168 g) were charged to a 5 liter flask fitted with a 5 liter flask fitted with an anchor stirrer, nitrogen inlet and thermometer. The temperature was raised to 100° C. and adipic acid (394 g) added, after which the batch temperature was raised to 150° C. Triethylene tetramine (960 g) was added over a period of 30 minutes, the temperature being maintained at 150° C. At the end of the addition, the temperature was raised to 240° C. and the batch held at this temperature for a period of four hours, water of reaction being allowed to escape from the flask.

The batch was cooled to 200° C. and vacuum applied to remove any water remaining. After cooling to 140° C. the batch was thinned to approximately 60% non-volatiles in xylol.

The product had an amine value of 220 mgKOH/g.

EXAMPLE 2

The procedure of Example 1 was repeated using isophthalic acid (448 g) in place of adipic acid.

The product had an amine value of 215 mgKOH/g.

EXAMPLE 3

Dimerised fatty acids (112 g) and isophthalic acid (132.8 g) were charged to a 1 liter flask and heated to 130° C. Triethylene tetramine (160 g) was added over a period of 15 minutes, after which the temperature was raised to 240° C. After a period of three hours at 240° C. the batch was cooled to 220 C. and 25" vacuum applied for a period of one hour. The high melting point resin obtained was cooled to approximately 160° C. at which point it was thinned to approximately 60% solids by the slow addition of butanol.

The resin had an amine value of 350 mgKOH/g.

EXAMPLE 4

The procedure of Example 2 was repeated using dimethyl terephthalate (524 g) in place of isophthalic acid.

The product had an amine value of 225 mgKOH/g.

EXAMPLE 5

A polyamide was made following the procedure of Example 3 using tall oil fatty acids (44 g) dimerised fatty acids (634 g), isophthalic acid (83 g) and 44″ diphenyl ether di-carboxylic acid (129 g) and tetraethylene pentamine (456 g).

The product was soluble in xylol and had an amine value of 300 mKOH/g.

EXAMPLE 6

A polyamide was made following the procedure of Example 3 using dimerised fatty acids (336 g), isophthalic acid (33.2 g), diphenic acid (48.4 g) and diethylene triamine (144 g).

The product was soluble in xylol and had an amine value of 208 mKOH/g.

EXAMPLE 7

The procedure of Example 3 was repeated using dimerised fatty acids (112 g), azelaic acid (37.6 g), isophthalic acid (99.6 g) and diethylene triamine (105 g). The product had a melting point of 100° C. and an amine value of 195 mgKOH/g and was soluble in butanol.

EXAMPLE 8

A curing agent was made following the procedure of Example 3 using tall oil fatty acids (56 g), dimerised fatty acids (224 g), isophthalic acid (83 g) and diethylene triamine (103 g).

The product had an amine value of 120 mgKOH/m and an acid value of 8.0 mgKOH/g.

EXAMPLE 9

The procedure of Example 3 was repeated using dimerised fatty acids (168 g), isophthalic acid (116.4 g), ethylene diamine (12 g), and diethylene triamine (82.4 g).

The solid resin had an amine value of 128 mgKOH/g, an acid value of 10.6 mgKOH/g and a melting point of 110° C.

EXAMPLE 10

Comparative

A polyamide was made according to Example 7 of British Patent Specification No. 789,108 from dimethyl terephthalate (97 g) and triethylene tetramine (73 g). The product was thinned to 70% non-volatile in butanol and had an amine value of 270 mgKOH/g.

EXAMPLE 11

Comparative

A curing agent was made according to the procedure of Example 3 from dimerised fatty acids (494 g), isophthalic acid (16.6 g) and triethylene tetramine (209 g).

The product had an amine value of 215 mgKOH/g.

Solutions of the polyamides of Examples 1–9 were made in the appropriate solvents, either xylol or butanol or mixtures thereof. In addition to Example 1 a solution of a commercially available polyamide based on dimerised fatty acids (Versamid 115X) was used as a comparative example.

These solutions were then used to cure various polyepoxy compounds, mixing ratios were determined from the amine value of the polyamide and the oxirane value of the polyepoxy compound, a slight excess (5%) of the epoxy compound being used. After mixing the solutions were each thinned to 3 poise with a 3:1 xylol/butanol mixture, and applied to glass panels without pre-ageing using an 0.004″ applicator. The results obtained are shown in Table 1.

Table II compares the properties of coatings based on curing agents of the invention with those of the prior art. White gloss finishes were prepared using Epikote 828 as the co-reactant. They were pigmented with rutile titanium dioxide RCR 2 to give a pigment:binder ratio of 0.8:1. They were thinned to give a viscosity of 4.0 poise with butanol and applied without preageing to burnished steel panels to give a dry film thickness of the order of 30 microns. Tests were carried out after 7 days air dry.

TABLE I

CURE WITH EPOXY RESINS

| CURING AGENT | EPOXY RESINS | | | | | |
|---|---|---|---|---|---|---|
| | Epikote 828 | Epikote 828[1] | D.E.R. 334 | D.R.H. 151 | MS 6064 | EX 612 |
| Vers. 115 COMPARATIVE (based on dimerised fatty acids). | Greasy film Cissing and crawling. Touch dry 15 hours | Greasy opaque film. Cissing and crawling. Touch dry 24 hours | Greasy film. Cissing and crawling. Touch dry 15 hours | Extensive cissing and crawling. Non drying | Extensive cissing and crawling. Non drying | Greasy rivelled films. Residual Tack. |
| Example 1 COMPARATIVE (based on dimerised fatty acids/ aliphatic di-acid) | Greasy film Cissing and crawling. Touch dry 15 hours | Greasy opaque film. Cissing and crawling. Touch dry 24 hours | Greasy film. Cissing and crawling. Touch dry 15 hours | Extensive cissing and crawling. Non drying | Extensive cissing and crawling. Non drying | Greasy rivelled films. Residual Tack. |
| Examples 2–9 (products of invention containing aromatic di-acids). | Touch dry 0.5–3 hours | Touch dry 2–8 hours | ←Clear non greasy films→ ←Free of imperfections→ Touch dry 0.5–3 hours | Touch dry 0.5–5 hours | Touch dry 0.5–5 hours | Touch dry 0–5–5 hours |

[1]Films applied at 0° C. and 95% R.H. Other films applied at 21° C. and 40% R.H.

TABLE II

| CURING AGENT | VERSAMID 115 | EXAMPLE 11 | EXAMPLE 2 | EXAMPLE 3 | EXAMPLE 10 |
|---|---|---|---|---|---|
| | | CURE WITH EPIKOTE 828 | | | |
| Isophthalic acid % | 0 | 10 | 50 | 80 | 100 |
| Amine value mgKOH/g | 220 | 215 | 215 | 350 | 270 |
| Curing agent/Ep 828 ratio | 57/43 | 58/42 | 58/42 | 46/54 | 52/48 |
| Film appearance | Incompatible Extremely greasy Extensive cissing | Slightly greasy | Fully satisfactory | | Slightly greasy |
| Gloss 20° | — | 89 | 93 | 90 | 33 |
| 60° | — | 95 | 97 | 96 | 75 |
| Bend Pass | — | ⅛ | ⅛ | ⅛ | ⅛ |
| Reverse impact Pass | — | 1.25 | 1.25 | — | — |
| Fail | — | 2.5 | 2.5 | 1.25 | 1.25 |
| Slow indent | — | 8.0 | 7.8 | 6.9 | 2.0 |
| Crosshatch adhesion | — | 100 | 95 | 95 | 90 |

We claim:

1. A polyamide containing free amino groups and suitable for use as a curing agent for polyepoxy compounds, said polyamide having an amine value of from 100 to 400 mg KOH/g, an acid value of from 0 to 20 mg KOH/g, and derived from (a) a polycarboxylic acid component comprising polymeric fatty acids together with from 10 to 90 mole %, based on the acid component of one or more aromatic dicarboxylic acids containing two carboxylic acid groups and at least one benzene ring, each carboxylic acid group being directly linked to a benzene ring, and (b) a polyamine component containing at least 50 mole % of at least one aliphatic polyamine defined by the formula:

$H_2NR(RNH)_nNH_2$ in which R is an alkylene radical and n is an integer of from 1 to 6.

2. A polyamide as claimed in claim 1, in which the aromatic dicarboxylic acid is selected from the group consisting of isophthalic acid, terephthalic acid, diphenic acid and diphenyl ether-4,4'-dicarboxylic acid.

3. A polyamide as claimed in claim 1 in which the polycarboxylic acid component also contains up to 50 mole % of one or more alphatic dicarboxylic acids.

4. A polyamide as claimed in claim 1 in which R is a methylene or ethylene radical.

* * * * *